(12) United States Patent
Diolaiti

(10) Patent No.: US 8,389,036 B2
(45) Date of Patent: Mar. 5, 2013

(54) PRODUCT OBTAINED FROM A POWDERED OR GRANULAR MATERIAL AND PROCESS FOR OBTAINING THE PRODUCT

(75) Inventor: Erminio Diolaiti, Bologna (IT)

(73) Assignees: Gianpaola Belloli, Bologna (IT); Erminio Diolaiti, Bologna (IT); Ippolito Ippolito, Bologna (IT)

( * ) Notice: Subject to any disclaimer, the term of this patent is extended or adjusted under 35 U.S.C. 154(b) by 118 days.

(21) Appl. No.: 12/160,601

(22) PCT Filed: Jan. 10, 2007

(86) PCT No.: PCT/IB2007/000061
§ 371 (c)(1),
(2), (4) Date: Jul. 11, 2008

(87) PCT Pub. No.: WO2007/080492
PCT Pub. Date: Jul. 19, 2007

(65) Prior Publication Data
US 2010/0159086 A1    Jun. 24, 2010

(30) Foreign Application Priority Data
Jan. 13, 2006   (IT) .............................. BO2006A0015
Oct. 25, 2006   (IT) .............................. BO2006A0737

(51) Int. Cl.
*A23F 5/12*   (2006.01)
(52) U.S. Cl. ........ 426/238; 426/285; 426/595; 426/640; 426/454; 426/455; 426/512
(58) Field of Classification Search ................. 426/106, 426/238, 245, 285, 640, 595, 453–455, 464, 426/512; 34/279
See application file for complete search history.

(56) References Cited

U.S. PATENT DOCUMENTS

| | | | |
|---|---|---|---|
| 1,641,446 A * | 9/1927 | McColl | 426/272 |
| 1,951,357 A | 3/1934 | Hall | |
| 2,345,320 A * | 3/1944 | Brenzinger | 426/454 |
| 2,371,093 A * | 3/1945 | Willison | 426/454 |
| 2,881,079 A * | 4/1959 | Simjian | 426/238 |
| 3,121,635 A * | 2/1964 | Eldred | 426/242 |
| 3,445,237 A * | 5/1969 | Gidge | 426/77 |
| 3,607,299 A * | 9/1971 | Bolt | 426/394 |
| 3,966,975 A * | 6/1976 | Hansen et al. | 426/285 |

(Continued)

FOREIGN PATENT DOCUMENTS

| | | |
|---|---|---|
| BE | 767 040 A1 | 10/1971 |
| CA | 2 313 356 A1 | 1/2001 |

(Continued)

OTHER PUBLICATIONS

Hess Olga and Adolf (Editors): "Wiener Kuche", 1986, Carl Ueberreuter, Wien (AT), XP002446210.

(Continued)

*Primary Examiner* — Drew E Becker
(74) *Attorney, Agent, or Firm* — Young & Thompson

(57) ABSTRACT

A process for processing a powdered or granular product, in particular in the form of a food-stuff, especially a product for infusion such as coffee, tea, cocoa, chocolate, preparation for broth and others, involves adding a liquid to a predetermined portion of the product and applying energy to the predetermined portion of product. Moreover, a layer (12) of material is made to adhere to a corresponding face (13) of a predetermined portion of the product.

17 Claims, 2 Drawing Sheets

U.S. PATENT DOCUMENTS

| | | | |
|---|---|---|---|
| 4,394,395 A | | 7/1983 | Rostagno et al. |
| 4,747,250 A | * | 5/1988 | Rossi .................. 53/511 |
| 4,852,333 A | * | 8/1989 | Illy .................. 53/436 |
| 4,975,295 A | * | 12/1990 | Sierra .................. 426/285 |
| 5,358,725 A | * | 10/1994 | Izumitani et al. .......... 426/238 |
| 5,776,527 A | * | 7/1998 | Blanc .................. 426/77 |
| 5,846,584 A | * | 12/1998 | Capodieci .............. 426/238 |
| 5,871,793 A | * | 2/1999 | Capodieci .............. 426/238 |
| 6,233,844 B1 | * | 5/2001 | Gallego Juarez et al. ...... 34/401 |
| 6,379,737 B1 | * | 4/2002 | Butterbaugh et al. ........ 426/594 |
| 7,685,931 B2 | * | 3/2010 | Rivera .................. 99/295 |
| 2002/0040643 A1 | * | 4/2002 | Ware .................. 99/467 |
| 2005/0217213 A1 | * | 10/2005 | Lozinski et al. .......... 53/453 |
| 2009/0214713 A1 | * | 8/2009 | Banim et al. ............ 426/80 |
| 2010/0323083 A1 | * | 12/2010 | Rubinstenn et al. ........ 426/594 |
| 2011/0027426 A1 | * | 2/2011 | Belloli .................. 426/79 |

FOREIGN PATENT DOCUMENTS

| | | |
|---|---|---|
| CH | 303264 A | 11/1954 |
| CH | 495 138 A | 8/1970 |
| CH | 652 277 A5 | 11/1985 |
| DE | 29621865 U1 | 4/1997 |
| DE | 10111780 A1 | 10/2002 |
| EP | 0 813 816 A1 | 12/1997 |
| EP | 0 272 432 A1 | 6/1998 |
| EP | 1 367 924 A1 | 9/2003 |
| EP | 2095716 A1 | 9/2009 |
| FR | 1029946 A | 6/1953 |
| FR | 2 772 558 A1 | 6/1999 |
| GB | 1204900 A | 9/1920 |
| GB | 464 903 A | 4/1937 |
| GB | 1507744 A | 4/1978 |
| GB | 2 394 163 A | 4/2004 |
| JP | 55 108241 A | 8/1980 |
| JP | 04 201882 A | 7/1992 |
| JP | 2004 352597 A | 12/2004 |
| NL | 6 800 635 A | 7/1969 |
| WO | 89/05095 A | 6/1989 |
| WO | 98/53700 A | 12/1998 |
| WO | 2006/078162 A | 7/2006 |
| WO | 2006/133483 A | 12/2006 |
| WO | 2007/080492 A | 7/2007 |
| WO | 2009/081250 A2 | 7/2009 |

OTHER PUBLICATIONS

European Search Report, Dated Aug. 11, 2010, in EP 09 01 0103.
International Search Report, Dated Sep. 30, 2009, in PCT/IB2008/003490.
Italian Search Report, Dated Sep. 2, 1010, in IT B020090790.

* cited by examiner

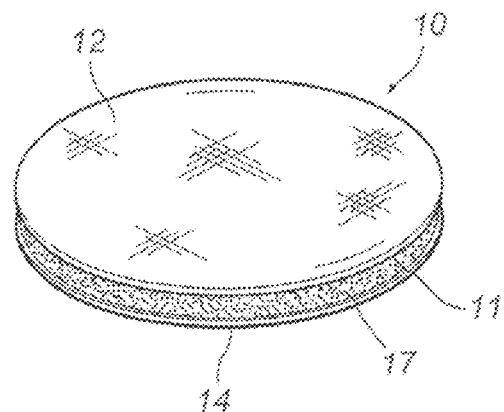
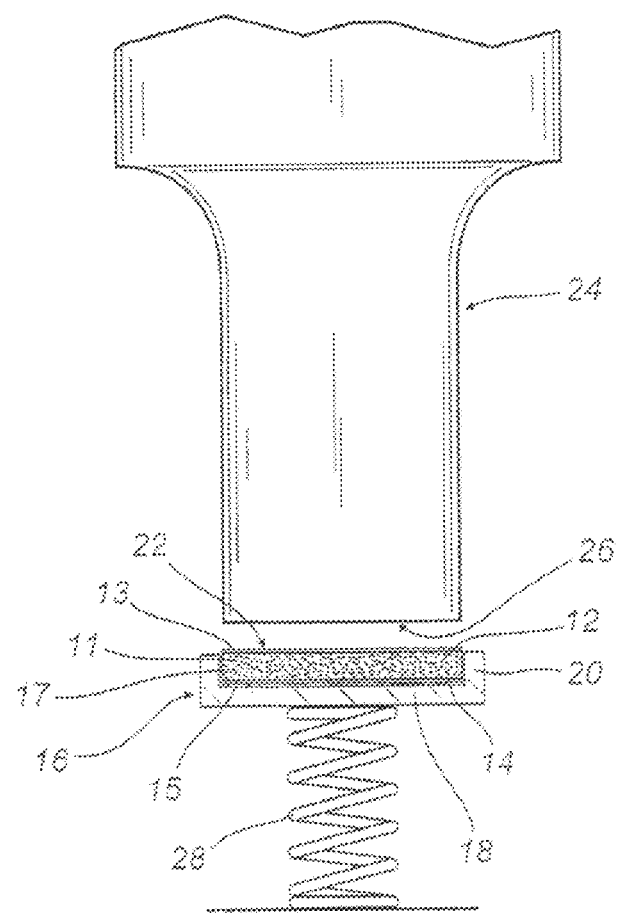

PRODUCT OBTAINED FROM A POWDERED OR GRANULAR MATERIAL AND PROCESS FOR OBTAINING THE PRODUCT

TECHNICAL FIELD

The present invention relates to a product obtained from a powdered or granular product or raw material, in particular a product of the foodstuff type, especially a product for infusion such as coffee, tea, cocoa, chocolate, preparation for broth and others.

The present invention also relates to a process for obtaining such a type of product.

BACKGROUND ART

Products for infusion of the above-mentioned type, in particular coffee, even in the domestic or private within, are usually divided into portions in the loose state, taken from the appropriate grinding machine, then placed in a suitable glass, to be inserted on the infusion machine. However, such a process has numerous disadvantages. It is not always possible to obtain portions of product consisting of the optimum quantity, meaning that an optimum resulting drink is not always guaranteed.

Moreover, the ease of handling of such a type of powdered or granular product is not optimum, since during the various product dosing and use operations particles may be dropped, resulting in dirt and necessitating subsequent careful cleaning, as well as in themselves compromising the hygiene of the environment in which such operations are performed.

Moreover, in the domestic within, additional equipment is required, such as teaspoons and the like, in order to handle such a granular product for infusion, and said equipment must then be washed, increasing the work to be done by consumers.

In addition, the ground product, kept in the grinding machine or the corresponding box until it is used, immediately begins to deteriorate. This is a disadvantage in terms of the goodness of the drink that will be obtained from it.

According to another method of consumption, powdered products for infusion of the above-mentioned type are usually consumed in containers made of rigid plastic material or contained in special pods, in filter paper film, in plastic film, or in aluminium film, which enclose the loose product contained in them and keep it compact.

One disadvantage in the use of special means for containing specific portions of product for infusion concerns the evident excessive use of material to obtain predetermined portions of material.

Said pack, or plastic capsule also has to be kept well sealed, to prevent the product from deteriorating, or to prevent the product from leaking out through any predefined holes which may be present in some prior art packs. This is usually done by placing the capsule in an additional containment envelope.

Moreover, according to another disadvantage, during the steps of producing such a product in pods or in plastic containers, it is rather complex and difficult to keep the loose granular or powdered product massed together in order to complete the pack.

Therefore, during the steps of producing such a product in pods or in plastic containers, it is important to have available complex and cumbersome means for feeding the granular or powdered product into the pod or into the respective capsule made of rigid plastic material.

DISCLOSURE OF THE INVENTION

This invention provides a product obtained from a powdered or granular product, in particular in the form of a foodstuff, especially a product for infusion such as coffee, tea, cocoa, chocolate, preparation for broth and others; characterised in that it comprises a layer of material adhering to said product.

The invention also provides a process for the production of a product from a powdered or granular product, in particular in the form of a foodstuff, especially a product for infusion such as coffee, tea, cocoa, chocolate, preparation for broth and others, characterised in that it involves making a layer of material adhere to a corresponding face of a predetermined portion of the product.

A product consisting of the optimum or desired portion is obtained, which may itself be used as the finished product, or inserted in infusion machines, without running the risk of directly contaminating the foodstuff, since the latter is protected by the layer of material.

Moreover, such a type of product may be used in packaging processes, being advantageous in terms of practical use and simplicity of the machines which process such a product.

According to another aspect, this invention also provides a powdered or granular product, in the form of a foodstuff, especially a product for infusion such as coffee, tea, cocoa, chocolate, preparation for broth and others, characterised in that it is in the form of a compact tablet.

Also provided is a process for processing a powdered or granular product, in particular in the form of a foodstuff, especially a product for infusion such as coffee, tea, cocoa, chocolate, preparation for broth and others, characterised in that energy is applied to a predetermined portion of product in such a way that the particles of the product are made to adhere to one another.

It is therefore possible to use this type of product in the compact condition in packaging processes, being advantageous in terms of practical use and simplicity of the machines which process such a product.

Moreover, the product in the form of a compact tablet may itself be used as the finished product. The advantage is that a product in a predetermined dose is obtained, also being an advantage in terms of constant results as regards the drink obtained.

Moreover, the outer layer of compact product allows improved preservation of the inner layers of product, again, in particular, being advantageous in terms of improved pleasantness of the drink obtained.

These and other features of the invention are clearly described in the claims below and its advantages are more apparent from the detailed description which follows, with reference to the respective drawings and the accompanying examples, which illustrates preferred embodiments provided merely by way of examples without restricting the scope of the inventive concept.

BRIEF DESCRIPTION OF THE DRAWINGS

The technical features and advantageous aspects of the invention are more apparent from the detailed description which follows, with reference to the accompanying drawings which illustrate preferred embodiments of the invention provided merely by way of example without restricting the scope of the inventive concept, and in which:

FIG. 2 is a perspective view of a second preferred embodiment of the product in accordance with the present invention;

FIG. 3 is a schematic cross-section of the preferred device for making a product in accordance with the present invention.

DETAILED DESCRIPTION OF THE PREFERRED EMBODIMENTS OF THE INVENTION

Figure 1:
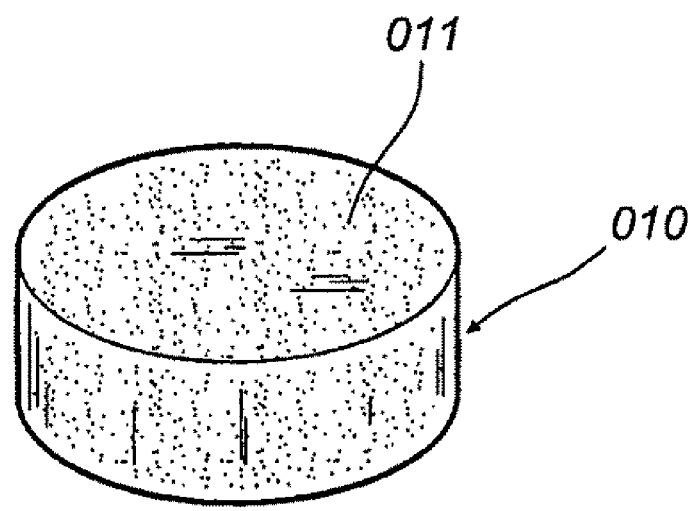
FIG. 1 is a perspective view of a first preferred embodiment of the product in accordance with the present invention.

FIG. 1 illustrates a first preferred embodiment of a product in the form of a foodstuff such as coffee, tea, cocoa, chocolate, preparation for broth and others, especially a powdered or granular product for infusion, consisting of suitable particles 011.

According to the present invention, the powdered or granular product is configured in the form of a compact tablet 010, in which the product particles 011 adhere to one another, forming a product aggregate configuration.

The powdered or granular product, in the form of a compact tablet 010 is such that it maintains its own volume, without the aid of additional containment means and therefore may be advantageously handled during the various operations to which it is subjected, in particular during packaging.

This compact tablet 010 of powdered or granular product may also be used itself as a finished product. The advantage is that a product in a predetermined dose is obtained, allowing a significantly constant level of results as regards the characteristics of the drink obtained.

Moreover, the outer layer of the tablet 010 allows improved preservation of the inner layers of product. Again, this is advantageous in terms of the goodness of the drink obtained.

The product tablet, or aggregate portion 010 consists practically solely of whole particles of the product, which adhere to one another in the whole condition.

Therefore, the infusion obtained from this is completely natural and conforms to the product in the non-aggregate, loose condition.

Advantageously, a process is provided for processing a powdered or granular product, in particular in the form of a foodstuff, especially a product for infusion such as coffee, tea, cocoa, chocolate, preparation for broth and others, in which an aggregating agent is added to the product and a predetermined portion of product is placed in a mould having a predetermined shape.

Energy is then applied to the predetermined portion of product so as to aggregate the particles of product, that is to say, to cause them to adhere to one another.

In a particularly advantageous way, said energy is applied in the form of mechanical vibrations, preferably in the form of ultrasonic mechanical vibrations.

A tablet or plug 010 is obtained, in which the product particles remain clearly separated from one another, adhering directly to one another, forming a compact or aggregate configuration of the powdered or granular product.

In a particularly preferred way, the aggregating agent is in the form of a liquid, in particular in the form of water, which, advantageously, does not substantially modify the product processed. However, other liquids or agents may also be used.

In particular, the aggregating agent is added in a quantity which may vary from 0.1% to 20% of the weight of the predetermined portion. The liquid is preferably added in a quantity which may vary from 3% to 10% of the weight of the predetermined portion.

Moreover, the product is supplied with energy in the form of mechanical vibrations, having a vibration frequency which may vary from 15,000 to 50,000 Hz, preferably being in the ultrasonic range, equal to 20,000 Hz.

In addition, a quantity of energy between 100 and 5,000 Joules is applied to the predetermined portion of product. The quantity of energy applied is preferably between 700 and 2,000 Joules, and it is particularly preferable that it should be substantially equal to 1,500 Joules.

It was found that at least part of the aggregating water evaporates during the step of applying energy to the predetermined portion of product, in particular during the step of applying mechanical energy.

EXAMPLE EMBODIMENT 1

5 grams of ground coffee were inserted in a suitable mould, then the product was moistened with a pre-dosed quantity of water equal to 8% of the weight of the material.

The product was then subjected to ultrasonic stress, using a sonotrode device, which gives off a sound vibration at a frequency of 20,000 Hertz with a predetermined energy equal to 1,500 Joules.

A compact plug or tablet is obtained, having the features illustrated in FIG. 1 and it maintains that configuration permanently, in which the particles of product for infusion are directly connected to or adhering to one another.

The tablet or aggregate portion is produced practically solely using whole particles of the product. Therefore, the infusion obtained from this is completely natural and conforms to the product in the non-aggregate condition.

The product obtained in this way may be part of a pack of a powdered or granular product, in the form of a foodstuff, especially a product for infusion such as coffee, tea, cocoa, chocolate, preparation for broth and others, which may, therefore, comprise the product in the form of a compact or aggregate tablet 010, in which the product particles adhere directly to one another, and in which there are suitable means for housing the product in the compact form.

In particular, the means for housing the product may be in the form of a first and a second product enveloping layer, giving a pod for infusion, in which the product inserted is in the form of a compact tablet 010, being advantageous in terms of preservation of the product contained and/or the quality of the infused product obtained.

According to another embodiment, the means for housing the compact product may be in the form of a capsule made of rigid material, for example plastic, or another material, in which the product inserted is in the form of the compact tablet 010, again being advantageous in terms of preservation of the product contained and/or the quality of the infused product obtained.

The present invention also relates to use of a compact tablet 010 of such a powdered or granular product, in particular in the form of a foodstuff, especially a product for infusion such as coffee, tea, cocoa, chocolate, preparation for broth and others, in a process for packaging such a powdered or granular product, implemented using a packaging apparatus.

FIG. 2 shows a second preferred embodiment of the product, in particular in the form of coffee, which could however be tea, cocoa, chocolate, preparation for broth and the like.

The present product is in the form of a foodstuff, especially a powdered or granular product for infusion, consisting of particles 11.

The powdered or granular product of this second embodiment is configured in the form of a compact tablet 10, in the same way as described relative to the first preferred embodiment, in which the product particles 11 adhere to one another, forming a product aggregate configuration.

The powdered or granular product, in the form of a compact tablet 10 is such that it maintains its own volume, without the aid of additional containment means and therefore may be advantageously handled, for example during the various operations to which it is subjected, in particular during packaging.

This compact tablet 10 of powdered or granular product may also be used itself as a finished product. The advantage is that a product in a predetermined dose is obtained, allowing a constant level of results as regards the drink obtained.

Moreover, the outer layer of the tablet 10 allows improved preservation of the inner layers of product. Again, this is advantageous in terms of the goodness of the drink obtained.

The product tablet, or aggregate portion 10 consists practically solely of whole, separate particles of the product, which directly adhere to one another.

Therefore, the infusion obtained from this tablet is completely natural and conforms to the product in the non-aggregate, loose condition.

In a particularly advantageous way, a layer of material 12 which adheres directly to the product is placed on the portion of product 10.

In practice, the layer of material 12 is joined to the product and is supported by it.

Application of this outer layer of material allows the product to be handled easily, without directly contaminating the foodstuff, in particular without having to resort to the complex preparation of pods or the like, as is the case in the prior art.

Advantageously, a second layer of material 14 which also adheres directly to the product is applied on the portion of product 10. The layer of material 14 is also joined to the product and is supported by it.

As illustrated, the portion of product 11 has opposite transversal faces 13, 15 and a lateral surface 17.

As illustrated, the first and second layers of material are in contact with opposite faces 13, 15 of the predetermined portion of the product 10.

In practice, the product 10, having the first and second layers 12, 14, may form a predetermined product pack, which can itself be used, for obtaining the infused product or the like.

As indicated, each layer of material 12, 14 is in contact with a corresponding transversal face 13, 15 of the predetermined portion of the product.

However, it is also possible to imagine a layer of material 12, 14 extending in contact with the lateral surface 17 of the predetermined portion of the product 11, or the presence of a special layer for covering the lateral surface 17 of the tablet 10, also adhering directly to the material 10.

The layer of material 12, 14 is preferably in the form of a film of paper material, such as filter paper, and as illustrated it is shaped in such a way that it has a circular outer profile.

Advantageously, a process was provided for producing a product 10, starting with a powdered or granular product 11, in particular in the form of a foodstuff, especially a product for infusion, preferably coffee.

It is understood that the starting product could also be cocoa, chocolate, preparation for broth and other products.

As illustrated, the portion of product 11 has opposite transversal faces 13, 15 and a lateral surface 17.

Advantageously, the present process involves making a layer of material 12 adhere to a face 13 of a predetermined portion of the product.

In particular, advantageously a first and a second layer of material 12, 14 are made to adhere to the corresponding faces 13, 15 of the predetermined portion of the product.

Advantageously, the process involves adding an aggregating agent, in particular in the form of a liquid, especially consisting of water, to the product. The layer of material 12, 14 is placed in contact with the product, preferably on a face 13, 15 of the predetermined portion of product.

The process involves applying energy to the predetermined portion 11 of product, in such a way as to aggregate the particles of product 11, or make them adhere to one another, and simultaneously cause the layer of material 12, 14 to adhere to a corresponding face 13, 15 of the predetermined portion 11 of product.

In practice, an aggregating agent, in particular in the form of a liquid, is added to the product and a predetermined portion of product is placed in a suitable mould having a predetermined shape, in contact with the respective layers of material 12 and 14.

Then, energy is applied to the predetermined portion of product in such a way as to aggregate the particles of product, or make them adhere to one another, and to make the layers of material 12 and 14 adhere to the particles of product at the respective face in contact with the relative layer of material.

In a particularly advantageous way, said energy is applied in the form of mechanical vibrations, preferably in the form of ultrasonic mechanical vibrations.

A tablet 10 is obtained, in which the product particles 11 remain clearly separated from one another, adhering to one another, forming a compact or aggregate configuration of the powdered or granular product and in which the layers of material 12 and 14 adhere directly to the compact portion of product.

In a particularly preferred way, the liquid is in the form of water, which, advantageously, does not substantially modify the product processed. However, other liquids or agents could also be used.

In particular, the agent, in particular in the form of water, is added in a quantity which may vary from 0.1% to 20% of the weight of the predetermined portion. Preferably, the agent, in particular in the form of water, is added in a quantity which may vary from 3% to 10% of the weight of the predetermined portion.

Moreover, the product is supplied with energy in the form of mechanical vibrations, having a vibration frequency which may vary from 15,000 to 50,000 Hz, preferably being in the ultrasonic range, equal to 20,000 Hz.

In addition, a quantity of energy between 100 and 5,000 Joules is applied to the predetermined portion of product. The quantity of energy applied is preferably between 700 and 2,000 Joules, and it is particularly preferable that it should be substantially equal to 1,500 Joules.

It was found that at least part of the aggregating water evaporates during the step of applying energy to the predetermined portion of product, in particular during the step of applying mechanical energy.

As illustrated in FIG. 3, the mould 16 has a base wall 18, a lateral wall 20 and an upper opening 22. The sonotrode 24 has a face 26 which closes the upper opening of the mould 16.

There are also elastic means 28 for compressing the predetermined portion.

In practice, the lower layer of filter paper 14 is placed in the mould, then the predetermined portion 11 of product is placed in the mould, and then the upper layer of filter paper 12 is put in the same mould 16, on top of the predetermined portion 11.

The opening in the mould is then closed using the sonotrode device 24 and ultrasonic energy is applied.

As illustrated, the first and second layers of material 12, 14 are in contact with opposite transversal faces 13, 15 of the predetermined portion of the product.

In an alternative embodiment there could also be a layer of material 12, 14 extending in contact with the lateral surface 17 of the predetermined portion of product 11.

Advantageously, the layer of material 12, 14 is in the form of a film, preferably a film made of porous material, paper material, such as filter paper, which facilitates the infusion process. However, use of said layers 12 and 14 made of a film of another material would also be imaginable.

A ready-packaged portion of product or tablet 10 is obtained, in the form of a disk-shaped element, having a circular outer profile, in which the respective layer of material 12, 14 extends over the entire transversal face of the portion of product 11 with which it is associated, having an outer edge substantially matching the outer perimeter of the portion of product 11. As illustrated, the layer of material 12, 14 therefore covers both the central part and the outer part of the corresponding face of the portion of product 11.

EXAMPLE EMBODIMENT 2

5 grams of ground coffee were inserted in a suitable mould, between a first and a second layer of filter paper, then the product was moistened with a pre-dosed quantity of water equal to 8% of the weight of the material.

The product was then subjected to ultrasonic stress, using a sonotrode device, which gives off a sound vibration at a frequency of 20,000 Hertz with a predetermined energy equal to 1,500 Joules.

A compact plug or tablet is obtained, having the features illustrated in FIG. 2 and it maintains that configuration permanently, in which the particles of product for infusion are directly connected to or adhering to one another and in which the two layers of filter paper adhere directly to the particles of aggregated product.

The tablet or aggregate portion is produced practically solely using whole particles of the product. Therefore, the infusion obtained from this is completely natural and conforms to the product in the non-aggregate condition.

The product obtained in this way may form a corresponding pack of a powdered or granular foodstuff, especially in the form of a product for infusion such as coffee, tea, cocoa, chocolate, preparation for broth and others, in which the product is compact or aggregated.

A plurality of said products 10 may be inserted, by stacking them, in a cartridge, made of plastic, metal or the like, consisting of a tube having a cylindrical inner surface forming a chamber for housing the products 10 and with a diameter slightly greater than the outer diameter of the products 10 and at the end of which there may be at least one slit for the emission of a respective product through corresponding engaging and pushing means.

The cartridge, in which the products are stacked with the transversal faces in contact with the adjacent product, may be associated with an infusion machine for supplying a predetermined portion of product to said machine in order to prepare the drink.

The present invention therefore involves use of a product, in particular in the form of a compact tablet 010 or 10, in a process for packaging a powdered or granular product, in particular in the form of a foodstuff, especially a product for infusion such as coffee, tea, cocoa, chocolate, preparation for broth and others.

The present invention therefore involves use of a product, in particular in the form of a compact tablet 010 or 10, in a process for infusion of a powdered or granular product, in particular in the form of a foodstuff, especially a product for infusion such as coffee, tea, cocoa, chocolate, preparation for broth and others.

The invention described has evident industrial applications and may be modified and adapted in several ways without thereby departing from the scope of the inventive concept. Moreover, all the details of the invention may be substituted by technically equivalent elements.

The invention claimed is:

1. A process for the production of a coffee tablet to be inserted into an infusion machine for obtaining a corresponding drink, wherein, starting with a powdered or granular product (11) coffee constituted by coffee for infusion, energy is applied to a predetermined portion of the powdered or granular product; wherein an aggregating agent in the form of water is added to the powdered or granular product; wherein water is added in a quantity from 3% to 10% of the weight of the predetermined portion; and wherein the energy applied to the powdered or granular product is in the form of ultrasonic mechanical vibrations, in such a way as to make the particles of the powdered or granular product directly adhere to one another.

2. The process according to claim 1, wherein the aggregating agent in the form of a liquid is added to the powdered or granular product.

3. The process according to claim 1, wherein the agent is added in a quantity substantially equal to 8% of the weight of the predetermined portion.

4. The process according to claim 1, wherein the energy applied in the form of vibrations has a vibration frequency which may vary from 15,000 to 50,000 Hz.

5. The process according to claim 4, wherein the energy has an ultrasonic vibration frequency equal to 20,000 Hz.

6. The process according to claim 1, wherein a quantity of energy between 100 and 5,000 Joules is applied to the predetermined portion of powdered or granular product.

7. The process according to claim 6, wherein a quantity of energy between 700 and 2,000 Joules is applied to the predetermined portion of powdered or granular product.

8. The process according to claim 7, wherein a quantity of energy substantially equal to 1,500 Joules is applied to the predetermined portion of powdered or granular product.

9. The process according to claim 1, wherein the predetermined portion of powdered or granular product is placed in a mould (16) which has a predetermined shape to form the coffee tablet.

10. The process according to claim 1, wherein at least part of the aggregating agent, or water, evaporates during the step of applying energy.

11. The process according to claim 1, wherein a ready-packaged portion of coffee tablet (10) is prepared, in the form of a disk-shaped element.

12. The process according to claim 1, wherein a ready-packaged portion of coffee tablet (10) is prepared, in the form of an element with a circular outer profile.

13. The process according to claim 1, wherein a layer (12) of material is made to adhere to a corresponding face (13) of a predetermined portion of the powdered or granular product.

14. A process for the production of a coffee tablet for infusion, comprising:
   providing a predetermined portion of particles of powdered or granular coffee and water in a mould, said water being from 3% to 20% by weight of said predetermined portion; and
   applying ultrasonic mechanical vibrations to said predetermined portion in said mould, said ultrasonic mechanical vibrations being sufficient to aggregate said particles and cause said particles to be directly connected to each other to form a coffee tablet for infusion in said mould, said coffee tablet being suitable for insertion into an infusion machine to obtain a coffee drink.

15. The process according to claim 14, wherein providing said predetermined portion in said mould is carried out by adding said particles into said mould, and adding said water to said particles in said mould.

16. The process according to claim 14, wherein providing said predetermined portion in said mould is carried out by adding said water to said particles, and placing a predetermined portion of said particles and water into said mould.

17. A process for the production of a coffee tablet to be inserted into an infusion machine for obtaining a corresponding drink, comprising:

adding an aggregating agent in the form of water to particles of a powdered or granular product consisting of ground coffee for infusion to form a predetermined portion, said water being from 3% to 20% of the weight of the predetermined portion;

applying ultrasonic mechanical vibrations to the predetermined portion, in such a way as to make the particles of the powdered or granular product in the predetermined portion directly adhere to one another.

\* \* \* \* \*

UNITED STATES PATENT AND TRADEMARK OFFICE
CERTIFICATE OF CORRECTION

PATENT NO. : 8,389,036 B2  
APPLICATION NO. : 12/160601  
DATED : March 5, 2013  
INVENTOR(S) : Erminio Diolaiti Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this
First Day of September, 2015

Michelle K. Lee
*Director of the United States Patent and Trademark Office*